United States Patent Office 2,698,856
Patented Jan. 4, 1955

2,698,856

COMPLEX POLYESTERS AND SALTS THEREOF

Joseph John Carnes and Richard Keith Madison, Stamford, Conn., assignors to American Cyanamid Company, New York, N. Y., a corporation of Maine No Drawing. Application September 10, 1952,
Serial No. 308,940

12 Claims. (Cl. 260—400)

This invention relates broadly to new and useful complex polyesters and to salts thereof. More particularly the invention is concerned with polyesters of aliphatic (including substituted aliphatic) sulfodicarboxylic acids and with salts of such polyesters. The scope of the invention also includes method features.

Salts of the present invention are unique in that they possess an unobvious combination of properties which renders them especially valuable as agents, or as components of compositions, for the treatment of a wide variety of textile materials, e. g., in the form of continuous-filament yarn, staple fiber, tow, roving, knitted, woven or felted fabrics, etc. This combination of properties includes a softening action on the textile; an ability to retard or obviate (especially in combination with other antistatic agents) the accumulation of static charges of electricity on such textiles which normally tend to become charged with static electricity; and an ability to function as a crystal growth-inhibiting agent when used as a component of antistatic finishing compositions that also contain certain inorganic salts having desirable antistatic characteristics but which, unless suitably modified, are unsatisfactory for antistatic uses. Additionally, the preferred salts of the present invention are readily soluble or dispersible in water, can be economically produced from commercially available raw materials, and can be easily prepared in a wide range of commercially useful forms (e. g., from viscous liquids to hard, waxy solids) and with solubility and other characteristics which will best meet the special requirements of a particular service application. The polyesters of the invention are especially valuable as intermediates in the preparation of the salts of the invention.

Esters of substituted and unsubstituted aliphatic sulfodicarboxylic acids of various classes and kinds were known prior to our invention. See, for example, Jaeger Patents 2,028,091 and 2,176,423; also, 2,072,085—De Groote et al., 2,184,794—De Groote, 2,454,546—Bock et al., and 2,507,030—Lynch.

Prior to our invention non-ionic surface-active compounds containing polyalkylene glycol groups, e. g., the stearic acid ester of a higher polyethylene glycol, were found to be relatively ineffective as softening agents for textiles, the softening effect (if any) decreasing with increasing length of the polyglycol chain. Surprisingly it was found that compounds of this invention, and which contain a combination of anionic sulfonate groups and polyalkylene glycol groups as the hydrophilic portions of the molecule, are unlike prior surface-active agents of the kind aforementioned in that they exhibit excellent softening and lubricating properties when applied to many different textile materials. More particularly it may be stated that compounds of our invention, including the preferred group, have outstanding characteristics as non-yellowing, softening agents for rayon, polyacrylonitrile and other textiles during hot finishing treatments and storage thereof. In this respect their properties are much like polyesters of sulfosuccinic acid of the kind disclosed and claimed in the copending application of Jack T. Thurston, Serial No. 188,485, filed October 4, 1950, now Patent No. 2,637,663, dated May 5, 1953; but with other improved properties, e. g., greatly increased solubility or dispersibility characteristics by reason of the incorporation of the alkylene glycol or polyoxyalkylene glycol groups without any loss of the effectiveness of the compound as a textile-softening agent. Hence our compounds can be used advantageously in the same applications and in essentially the same manner disclosed in the aforementioned copending Thurston application.

To the best of our knowledge and belief the compounds with which the present invention is concerned are new and have not been described in prior patents or scientific publications. As will be more readily understood from the following more detailed description, formulas and examples, the polyesters (as such or in the form of their cationic salts) of our invention are characterized by having two different ester groups combined with an unsubstituted or substituted aliphatic sulfodicarboxylic acid radical, and by the fact that there are two of such acid groups per molecule.

The salts of the present invention are addition products of (1) a bisulfite (including meta-bisulfite), more particularly a water-soluble bisulfite, or the equivalent of a bisulfite, and (2) a polyester which is a condensation product of (A) a glycerol ester, more particularly a fatty acid monoglyceride or diglyceride or a mixture thereof, wherein the fatty acid component thereof contains at least 8 carbon atoms, with (B) an esterification product of (a) an aliphatic dihydroxy compound, more particularly an alkylene glycol or a polyoxyalkylene glycol, and (b) an ethylenically unsaturated dicarboxylic compound selected from the class consisting of ethylenically unsaturated dicarboxylic acids and anhydrides thereof. The ethylenically unsaturated grouping of the aforementioned dicarboxylic compound is alpha to a carbonyl group, and the reactants of (a) and (b) are employed in a molar ratio of 1 mole of the former to about 2 moles of the latter. The glycerol ester of (A) and the esterification product of (B) are employed in a molar ratio of about 2 moles of the former to 1 mole of the latter. The molar ratio of the glycerol ester of (A) and the esterification product of (B) may be a little more or a little less than 2 moles of the former to 1 mole of the latter, e. g., from 1.9 to 2.1 moles of the glycerol ester of (A) to 1 mole of the esterification product of (B). (As will be understood by those skilled in the art, the molecular weight of such glycerol esters as the monoglyceride or diglyceride, or mixtures thereof, of fatty acids derived from tallow, cottonseed oil and other vegetable and animal oils and fats is difficult to determine with great exactness so that usually only approximate molecular weights can be obtained, and this is reflected in the molar ratios.) Similarly, the molar ratio of the ethylenically unsaturated dicarboxylic compound and the aliphatic dihydroxy compound may be a little more or a little less than 2 moles, e. g., from 1.9 to 2.1 moles, of the former to 1 mole of the latter.

Of the aforementioned salts, the preferred class is composed of those which are represented by the following general formula:

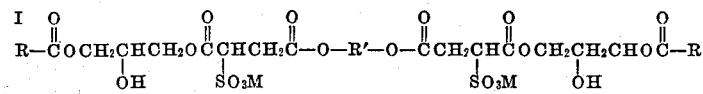

where R represents an aliphatic radical containing at least 7 carbon atoms, R' represents a divalent aliphatic or other organic radical containing at least 2 carbon atoms, more particularly (a) an alkylene radical containing at least 2 carbon atoms, e. g., ethylene, propylene, butylene, pentylene, hexylene, heptylene, octylene, nonylene to octadecylene, inclusive, or (b) a polyoxyalkylene radical, more particularly such a radical represented by the general formula —CHR''(CH$_2$OCHR'')$_n$CH$_2$— where R'' represents hydrogen or a methyl radical and $n$ represents a number between 1 and about 135, and M is a salt-forming cation.

Examples of salt-forming cations represented by M in the above formula are any of the alkali metals, ammonium, polyvalent metals (e. g., barium, strontium, calcium, magnesium, etc.) or those derived from organic bases such, for instance, as methyl, ethyl, propyl and butyl amines, dimethyl, diethyl, dipropyl and dibutyl amines, mono-, di- and triethanol amines, as well as other higher aliphatic and hydroxy-aliphatic amines, guanylurea, guanidine, hydroxyethylguanidine, biguanide, aryl amines, e. g., aniline, etc., aralkyl amines, e. g., benzyl amine, etc., alkaryl amines, e. g., toluidine, etc., and heterocyclic bases, e. g., nicotine, pyridine, quinoline, alkaloids, etc.

Illustrative examples of aliphatic radicals represented by R in Formula I are heptyl, octyl, octenyl, nonyl, decyl, decenyl, undecyl, undecenyl, tridecyl, pentadecyl, heptadecyl, heptadecenyl, nonadecyl, heneicosyl, heneicosenyl, tricosyl, etc.

The reactions involved in the preparation of the salts of this invention are (A) esterification, (B) condensation and (C) sulfonation at the double bonds of the condensation product of (B) with a bisulfite, more particularly a water-soluble bisulfite. Taking ethylene glycol as illustrative of the aliphatic dihydroxy compound, maleic anhydride as illustrative of the ethylenically unsaturated dicarboxylic compound, a fatty acid monoglyceride as illustrative of the glycerol ester and sodium bisulfite as illustrative of the bisulfite, the equations for the reactions may be illustrated as follows:

A. ESTERIFICATION $$\text{II} \quad 2 \begin{array}{c} \text{HC} - \text{C} \\ \| \\ \text{HC} - \text{C} \end{array} \!\!\! \diagdown\!\!\!\!\! \diagup \text{O} + \text{HOCH}_2\text{CH}_2\text{OH} \longrightarrow$$

$$\text{HOOCCH}=\text{CHCO}-\text{O}-\text{CH}_2\text{CH}_2-\text{O}-\text{OCCH}=\text{CHCO}-\text{OH}$$

B. CONDENSATION $$\text{III} \quad 2 \begin{array}{c} \text{CH}_2\text{OC}-\text{R} \\ | \\ \text{CHOH} \\ | \\ \text{CH}_2\text{OH} \end{array} + \text{HOOCCH}=\text{CHCO}-\text{O}-\text{CH}_2\text{CH}_2-\text{O}-\text{OCCH}=\text{CHCO}-\text{OH} \longrightarrow$$

$$\begin{array}{c} \text{CH}_2\text{OC}-\text{R} \\ | \\ \text{CHOH} \\ | \\ \text{CH}_2\text{OCCH}=\text{CHCO}-\text{O}-\text{CH}_2\text{CH}_2-\text{O}-\text{OCCH}=\text{CHCOOCH}_2 \end{array} \quad \begin{array}{c} \text{CH}_2\text{OC}-\text{R} \\ | \\ \text{CHOH} \\ | \\ \end{array} \quad + 2\text{H}_2\text{O}$$

Polyester

C. SULFONATION

IV   2NaHSO₃ + Polyester product of Equation III ⟶

$$\text{R}-\text{COOCH}_2\text{CHCH}_2\text{OOCCHCH}_2\text{C}-\text{O}-\text{CH}_2\text{CH}_2-\text{O}-\text{CCH}_2\text{CHCOOCH}_2\text{CHCH}_2\text{OC}-\text{R}$$
$$\qquad\qquad\quad |\qquad\quad\; |\qquad\qquad\qquad\qquad\qquad\qquad\qquad |\qquad\quad\; |$$
$$\qquad\qquad\quad \text{OH}\quad\;\text{SO}_3\text{Na}\qquad\qquad\qquad\qquad\quad\text{SO}_3\text{Na}\quad\text{OH}$$

In Equation III R has the same meaning as given above with reference to Formula I, that is, it represents an aliphatic radical containing at least 7 carbon atoms and preferably, for the usual applications of the products, not more than 21 carbon atoms. However, in some cases, especially when the ease of dispersibility of the product in water or other liquid medium is not a matter of primary importance, the aliphatic radical represented by R may contain as high as, for instance, 29 carbon atoms or higher.

Instead of maleic anhydride shown for purpose of illustration in Equation II, one can use other ethylenically unsaturated dicarboxylic acids or available anhydrides thereof, and wherein the ethylenically unsaturated grouping is alpha to a carbonyl group, for instance fumaric, citraconic, itaconic or mesaconic acids or their available anhydrides. We prefer to use maleic anhydride, although maleic acid or fumaric acid likewise can be employed to produce a product containing sulfosuccinic groupings.

Instead of ethylene glycol, also shown for purpose of illustration in Equation II, one can use other simple alkylene glycols, e. g., propylene, butylene, pentylene, heptylene, hexylene, octylene, nonylene to octadecylene (and higher) glycols and wherein the alkylene grouping is either straight or branched chain; the polyoxyalkylene glycols, or polyalkylene glycols as they are perhaps more commonly designated, e. g., diethylene glycol, triethylene glycol, dipropylene glycol, tripropylene glycol and the higher polymers of the lower alkylene glycols; as well as others. The polymers of the lower alkylene glycols are available in a variety of average molecular weights ranging from approximately 200 up to 6000 and higher. Some of the more generally available of these polymeric lower-alkylene glycols are listed below with their commercial designations, together with their average molecular weights:

| Polyalkylene glycol: | Average molecular weight |
|---|---|
| Polyethylene glycol, 200 | 190–210 |
| Polyethylene glycol, 300 | 285–315 |
| Polyethylene glycol, 400 | 380–420 |
| Polyethylene glycol, 600 | 570–630 |
| Polypropylene glycol, 150 | 140–160 |
| Polypropylene glycol, 425 | 400–450 |
| Polypropylene glycol, 750 | 700–800 |
| Polypropylene glycol, 1025 | 975–1075 |
| Polypropylene glycol, 1200 | 1150–1250 |
| Polypropylene glycol, 2025 | 1950–2100 |
| "Carbowax" compound, 1000 | 950–1050 |
| "Carbowax" compound, 1540 | 1300–1600 |
| "Carbowax" compound, 4000 | 3000–3700 |
| "Carbowax" compound, 6000 | 6000–7500 |

The above "Carbowax" compounds are wax-like polyethylene glycols having the aforementioned average molecular weights. These polyalkylene (polyoxyalkylene) glycols contain residues or radicals which can be expressed by the general formula hereinbefore given with reference to Formula I. When $n$ in that formula represents about 135, a typical example of a polyoxyalkylene glycol employed to get the final product represented by Formula I would be "Carbowax" compound 6000. Unlike other "Carbowax" compounds, "Carbowax" compound 1500 (used in one of the examples that follow) is a blend of about equal parts of polyethylene glycol 300 and "Carbowax" 1540, and has an average molecular weight of from 500 to 600.

As the glycerol ester which is caused to react with the esterification product of the aliphatic dihydroxy compound (e. g., an alkane diol) and the ethylenically unsaturated dicarboxylic compound we prefer to use a monoglyceride of a fatty acid containing at least 8 carbon atoms (particularly those having from 12 to 18 carbon atoms, inclusive). Examples of such glycerol esters are the monoglycerides of caprylic, capric, lauric, myristic, palmitic, stearic, arachidic, behenic, carnaubic, cerotic, montanic and melissic acids; and oleic, elaidic, isoöleic, rapic, erucic, brassidic, and other unsaturated fatty acids. Such acids are obtainable from and include those derived from vegetable and animal oils and fats, for instance those derived from soya bean oil, cottonseed oil, coconut oil, linseed oil, castor oil, dehydrated castor oil and the like, or from other commercial sources such as talloil. One can also use the diglycerides of a fatty acid (or mixtures of fatty acids) of the kind aforementioned, as well as a mixture of a fatty acid monoglyceride and diglyceride in any proportions.

The condensation reaction represented by Equation III is preferably continued until at least the theoretical quantity of the water of reaction has been removed.

The sulfonation reaction indicated in Equation IV is carried out in accordance with conventional procedure. The bisulfite or meta-bisulfite or mixture thereof in any proportions is preferably employed in a molar ratio corresponding to about 2 moles thereof, or somewhat higher, e. g., up to 3 moles thereof, per mole of the linear polyester condensation product so that one sulfo group is added at each of the two double bonds in the said polyester. If it be desired to add only one sulfo group at one of the double bonds of the polyester, as sometimes may be the case, then as little as 1 mole (or slightly thereabove) of the bisulfite can be employed for each mole of the linear polyester.

From the foregoing it will be seen that M in Formula I is obtained by substantially complete sulfonation of the ethylenically unsaturated polyester with a bisulfite or meta-bisulfite or a mixture thereof, which bisulfite or meta-bisulfite contains a cationic salt-forming substituent of which numerous examples have been given hereinbefore. Preferably the sulfonation is carried out by heating the polyester in a solution of a soluble bisulfite of an organic or inorganic base dissolved in water or a mixture of water and an organic solvent which is miscible therewith, e. g., ethanol. Heating is continued until the desired degree of sulfonation has taken place and the salt corresponding to the bisulfite (including meta-bisulfite) employed has been directly produced.

In addition to the alkali-metal, ammonium and amine salts that readily can be produced by direct sulfonation of the unsaturated polyester with a bisulfite, salts of other bases may be prepared by first acidifying, with a mineral or other strong acid (e. g., HCl), an alcoholic solution of the alkali-metal, ammonium or amine salt, whereby the free polyester of the substituted or unsubstituted aliphatic sulfodicarboxylic acid is obtained, filtering off the inorganic or other salt of the acid used, and reacting the acid polyester with the desired base. Although they are not ordinarily employed in textile-finishing or treating operations, salts of the polyvalent metals such, for instance, as calcium, barium, lead, cadmium and the like may be prepared, if desired, by adding a stoichiometric quantity of an oxide or hydroxide thereof to an alcoholic solution of the acid polyester, followed by stirring until salt formation has been completed.

The salts of the present invention have a wide field of utility in addition to the treatment of textile materials, e. g., those formed of or containing fibers of polyacrylonitrile, cellulose esters, viscose rayons, nylon, etc., for the purposes indicated in the second paragraph of this specification. Other typical service applications include their use as emulsifying agents, detergents, dye assistants, dispersing agents in making emulsions and dispersions of various chemicals and compositions, e. g., emulsions of hydrocarbons of the aliphatic and aromatic series, as components of dye preparations, printing inks, writing inks, and for numerous other purposes where it is desirable or advantageous to employ a surface-active agent having in its chemical configuration a substantially balanced or an adjusted (as desired or as conditions may require) relationship or arrangement between hydrophobic and hydrophilic portions thereof.

In order that those skilled in the art may better understand how the present invention can be carried into effect, the following examples are given by way of illustration and not by way of limitation. All percentages are by weight.

EXAMPLE 1

A. *Preparation of the dimaleate ester of ethylene glycol*

Maleic anhydride, 196 g. (2.0 moles), and ethylene glycol, 62 g. (1.0 mole), were placed in a 1-liter, three-neck flask fitted with condenser, stirrer, thermometer, and a nitrogen-inlet tube. The temperature was raised to 110° C. where the reaction became exothermic and the temperature rose to 148° C. The temperature was maintained at 148° C. for one hour. The product, a pale yellow somewhat viscous liquid, had an acid number of 455 (calc'd 435).

B. *Condensation of the dimaleate ester of ethylene glycol with glyceryl monostearate*

Ethylene glycol dimaleate, 241 g. (0.975 mole, calculated from the acid number), glyceryl monostearate, 690 g. (1.95 moles, calculated from the saponification number), and 100 ml. of xylene were placed in a two-liter, three-neck flask fitted with water trap, condenser, stirrer, thermometer, and a nitrogen-inlet tube. The temperature was rapidly raised to 190–195° C. and maintained there until at least the theoretical amount of water of reaction had been collected. After 4½ hours at 190–195° C., 36.8 ml. (102%) of water had been collected. The xylene was removed by distillation under reduced pressure. The product, a white waxy solid, had an acid number of 5.9.

C. *Sulfonation of the condensation product of glyceryl monostearate and ethylene glycol dimaleate*

The product prepared in B, 500 g., $Na_2SO_3$, 7.0 g. (0.056 mole), $Na_2S_2O_5$, 110 g. (0.579 mole), denatured ethanol, 632 g., and water, 240 g., were placed in a 3-liter, three-neck flask fitted with a stirrer and condenser. Heating was by means of a steam bath. The mixture was maintained at reflux for 20¼ hours. At this time the sulfonation was 87.5% complete. The excess bisulfite was oxidized with $H_2O_2$ and the pH was adjusted to ca. 6.5 with 20% NaOH solution. The mixture was stripped to 65.7% solids. The product was a white, waxy solid.

EXAMPLE 2

A. *Preparation of the dimaleate ester of triethylene glycol*

Maleic anhydride, 196 g. (2.0 moles), and triethylene glycol, 150 g. (1.0 mole), were placed in a one-liter, three-neck flask fitted with a condenser, stirrer, thermometer, and a nitrogen-inlet tube. The temperature was raised to 125° C. where the reaction became exothermic and the temperature rose to 160° C. The temperature was maintained at 140° C. for one hour. The product, a pale yellow somewhat viscous liquid, had an acid number of 319 (calc'd 324).

B. *Condensation of the dimaleate ester of triethylene glycol with glyceryl monostearate*

Triethylene glycol dimaleate, 346 g. (0.985 mole, calculated from the acid number), and 685 g. (1.97 moles, calculated from the saponification number) of glyceryl monostearate and 100 ml. of xylene were placed in a two-liter, three-neck flask fitted with a water trap, condenser, stirrer, thermometer, and a nitrogen-inlet tube. The temperature was rapidly raised to 185–190° C. and maintained there until at least the theoretical amount of water of reaction had been collected. After 4¼ hours at 185–190° C., 36 ml. (101%) of water had been collected. The xylene was removed by distillation under reduced pressure. The product, a white, waxy solid, had an acid number of 3.8.

C. *Sulfonation of the condensation product of glyceryl monostearate and triethylene glycol dimaleate*

The product prepared in B, 940 g., $Na_2SO_3$, 15.4 g. (0.122 mole), 800 ml. denatured ethanol, and 300 ml. of water were placed in a three-liter, three-neck flask fitted with a stirrer and condenser. Heating was by means of a steam bath. After 15 minutes' refluxing, 152 g. (0.800 mole) of $Na_2S_2O_5$ was added. The mixture was maintained at reflux for 20 hours. At this time the sulfonation was 93% complete. Hydrogen peroxide was added to oxidize the excess bisulfite to bisulfate, and the pH was raised to 6.0–6.5 by the addition of sodium hydroxide solution. The mixture was stripped to 71.2% solids. The product was a white, waxy paste.

EXAMPLE 3

A. *Preparation of the dimaleate ester of hexaethylene glycol*

Maleic anhydride, 196 g. (2.0 moles), and hexaethylene glycol, 282 g. (1.0 mole), were placed in a one-liter, three-neck flask fitted with a condenser, stirrer, thermometer, and nitrogen-inlet tube. The temperature was raised to 128° C. where the reaction became exothermic and the temperature rose to 148° C. The reaction was kept at 135° C. for one hour. The product, a pale yellow somewhat viscous liquid, had an acid number of 223 (calc'd 234).

B. *Condensation of the dimaleate ester of hexaethylene glycol with glyceryl monostearate*

Hexaethylene glycol dimaleate, 467 g. (0.93 mole, calculated from the acid number), 648 g. (1.86 moles) of glyceryl monostearate and 75 ml. of xylene were placed in a two-liter, three-neck flask fitted with a water trap, condenser, stirrer, thermometer, and nitrogen-inlet tube. The temperature was rapidly raised to 180–185° C. and maintained there until at least the theoretical amount of water of reaction had been collected. After 5 hours at 180–185° C., 34 ml. (102%) of water had been collected. The xylene was removed under vacuum. The product, a tan waxy solid, had an acid number of 14.8.

C. *Sulfonation of the condensation product of glyceryl monostearate and hexaethylene glycol dimaleate*

The product prepared in B, 881 g., $Na_2SO_3$, 29.4 g. (0.23 mole), denatured ethanol, 1 liter, and water, 400 ml., were placed in a three-liter, three-neck flask fitted with a stirrer and condenser. Heating was by means of a steam bath. After 15 minutes' refluxing, 143 g. (0.75 mole) of $Na_2S_2O_5$ was added. The mixture was maintained at reflux for 14 hours. At this time the sulfonation was 95% complete. The excess bisulfite was oxidized to bisulfate with hydrogen peroxide and the pH was raised to 6–6.5 by the addition of sodium hydroxide solution. The mixture was stripped to 70.5% solids. The product was a white, waxy paste.

EXAMPLE 4

A. *Preparation of the dimaleate ester of nonaethylene glycol*

Maleic anhydride, 101 g. (1.03 moles), was placed in a one-liter, three-neck flask fitted with a condenser, stirrer, thermometer, nitrogen-inlet tube, and a dropping funnel. The maleic anhydride was melted and nonaethylene glycol, 213 g. (0.515 moles), was slowly dropped in. The temperature was raised to 120° C. where the reaction became exothermic and the temperature rose to 138° C. The temperature was maintained at 140° C. for one hour. The product, a pale yellow viscous liquid, had an acid number of 204 (calc'd 184).

B. *Condensation of the dimaleate ester of nonaethylene glycol and glyceryl monostearate*

Nonaethylene glycol dimaleate, 311 g. (0.566 mole, calculated from the acid number), glyceryl monostearate, 395 g. (1.134 moles, calculated from the saponification number), and 75 ml. of xylene were placed in a one-liter, three-neck flask fitted with a water trap, condenser, stirrer, thermometer, and a nitrogen gas-inlet tube. The temperature was rapidly raised to 180–185° C. and maintained there until at least the theoretical amount of water of reaction had been collected. After 4½ hours at 180–185° C., 21.5 ml. (105%) water had been collected. The xylene was removed by distillation under vacuum. The product, a tan, waxy solid, had an acid number of 7.7.

C. *Sulfonation of the condensation product of glyceryl monostearate and nonaethylene glycol dimaleate*

The product prepared in B, 608 g., $Na_2SO_3$, 10.5 g. (0.083 mole), denatured ethanol, 800 ml., and water, 300 ml., were placed in a three-liter, three-neck flask fitted with a stirrer and condenser. Heating was by means of a steam bath. After 15 minutes' refluxing, 88 g. (0.462 mole) $Na_2S_2O_5$ was added. The mixture was maintained at reflux for 20½ hours. At this time the sulfonation was 91% complete. The excess bisulfite was oxidized to bisulfate with hydrogen peroxide, and the pH was raised to 6–6.5 by the addition of sodium hydroxide solution. The mixture was stripped to 69.3% solids. The product was a white, waxy paste.

EXAMPLE 5

A. *Preparation of the dimaleate ester of polyethylene glycol 400*

Maleic anhydride, 588 g. (6.0 moles) and polyethylene glycol 400, 1185 g. (3.0 moles, calculated from hydroxyl number), were placed in a three-liter, three-neck flask fitted with condenser, stirrer, thermometer, and a nitrogen-inlet tube. The temperature was raised to 125° C. where the reaction became exothermic and the temperature rose to 155° C. The temperature was maintained at 140° C. for 1¼ hours. The product was a pale yellow, viscous liquid and had an acid number of 200.5 (calc'd 189.5).

B. *Condensation of the dimaleate ester of polyethylene glycol 400 with glyceryl monostearate*

Polyethylene glycol 400 dimaleate, 606 g. (1.08 moles, calculated from acid number), glyceryl monostearate, 755 g. (2.16 moles, calculated from the saponification number), and 100 ml. xylene were placed in a two-liter, three-neck flask fitted with a water trap, condenser, stirrer, thermometer, and nitrogen gas-inlet tube. The temperature was raised rapidly to 195–200° C. and maintained there until at least the theoretical amount of water of reaction had been collected. After six and one-half hours at 195–200° C., 39.5 ml. (101%) water had been collected. The xylene was removed by distillation under reduced pressure. The product, a tan, waxy solid, had an acid number of 4.8.

C. *Condensation of the dimaleate ester of polyethylene glycol 400 with tallow monoglyceride*

Polyethylene glycol 400 dimaleate, 591 g. (1.06 moles, calculated from acid number), tallow monoglyceride, 736 g. (2.11 moles), and 100 ml. xylene were placed in a two-liter, three-neck flask fitted with a water trap, condenser, stirrer, thermometer, and nitrogen gas-inlet tube. The temperature was raised to 190–195° C. and maintained there until water of reaction ceased to distill. After 7 hours at 190–195° C., 34.7 ml. (91%) water had been collected. The xylene was removed by distillation under reduced pressure. The product, a dark brown paste, had an acid number of 6.7.

D. *Sulfonation of the condensation product of polyethylene glycol 400 dimaleate and glyceryl monostearate*

The product prepared in B, 669 g., 506 g. (1.140 moles) of a 32.3% solution of ethanolamine bisulfite, and 750 ml. denatured ethanol were placed in a three-liter, three-neck flask fitted with a stirrer and condenser. Heating was by means of a steam bath. The mixture was maintained at reflux for 114 hours at which time the sulfonation was 86.5% complete. The excess bisulfite was oxidized with hydrogen peroxide, and ethanolamine equivalent to the bisulfate was added. The mixture was stripped to 75.1% solids. The product was a tan, waxy paste.

E. *Sulfonation of the condensation product of polyethylene glycol 400 dimaleate and tallow monoglyceride*

The product prepared in C, 1176 g., $Na_2SO_3$, 17.8 g. (0.141 mole), water, 700 ml., and denatured ethanol, 1500 ml., were placed in a five-liter, three-neck flask fitted with a condenser and stirrer. Heating was by means of a steam bath. After 15 minutes' refluxing, 195.5 g. $Na_2S_2O_5$ (1.03 moles) was added. The mixture was maintained at reflux for 30 hours. At this time the sulfonation was 90.6% complete. The excess bisulfite was oxidized to bisulfate with hydrogen peroxide, and the pH was raised to 6–6.5 by addition of sodium hydroxide solution. The mixture was stripped to 69.5% solids. The product was a brown, soft paste.

F. *Sulfonation of the condensation product of polyethylene glycol 400 dimaleate and glyceryl monostearate*

The product prepared as in B, 656 g., $Mg(HSO_3)_2$, 291 g. of 36% solution, (0.56 mole), and 630 g. denatured ethanol were placed in a three-liter, three-neck flask fitted with condenser and stirrer. Heating was by means of a steam bath. After 19 hours at reflux, the sulfonation was 100% complete. The excess bisulfite was oxidized to bisulfate with hydrogen peroxide, and the pH was raised to 6–6.5 by addition of magnesium oxide. The mixture was stripped to 65.5% solids. The product was a cream-colored, stiff paste.

EXAMPLE 6

A. *Preparation of the dimaleate ester of polyethylene glycol 600*

Maleic anhydride, 196 g. (2.0 moles) and polyethylene glycol 600, 640 g. (1.065 moles), were placed in a two-liter, three-neck flask fitted with a condenser, stirrer, thermometer, and a nitrogen-inlet tube. The temperature was raised to 151° C. and maintained there for two hours. The product, a pale yellow, viscous liquid, had an acid number of 145 (calc'd 141).

B. *Condensation of the dimaleate ester of polyethylene glycol 600 with glyceryl monostearate*

Polyethylene glycol 600 dimaleate, 802 g. (1.038 moles, based on acid number), glyceryl monostearate, 722 g. (2.076 moles), and xylene, 200 ml., were placed in a three-liter, three-neck flask fitted with a water trap, condenser, stirrer, thermometer, and a nitrogen-inlet tube. The temperature was raised rapidly to 195–200° C. and maintained there for 7 hours. At the end of this period, 37 ml. (99%) of the water of reaction had been collected. The xylene was removed by distillation under reduced pressure. The product, a pale tan, waxy solid, had an acid number of 3.0.

C. *Sulfonation of the condensation product of polyethylene glycol 600 dimaleate and glyceryl monostearate*

The product prepared in B, 750, g., $Na_2SO_3$, 5.0 g. (0.04 mole), water, 500 g., and denatured ethanol, 788 g., were placed in a three-liter, three-neck flask fitted with a stirrer and condenser. Heating was by means of a steam bath. After 15 minutes' refluxing, 101 g. (0.53 mole) of $Na_2S_2O_5$ was added. The mixture was maintained at reflux for 47½ hours. At the end of this period the sulfonation was 85.5% complete. The excess bisulfite was oxidized to bisulfate with hydrogen peroxide, and the pH was raised to 6–6.5 by addition of sodium hydroxide solution. The mixture was stripped to 65.6% solids. The product was a cream-colored paste.

EXAMPLE 7

A. *Preparation of the dimaleate ester of Carbowax 1500*

Maleic anhydride, 65.4 g. (0.67 mole), and Carbowax 1500, 183 g. (0.33 mole), were placed in a one-liter, three-neck flask fitted with a condenser, stirrer, thermometer, and nitrogen-inlet tube. The temperature was raised to 145° C. and maintained there for two hours. The product, a pale yellow, viscous liquid, had an acid number of 66.6 (calc'd 66.0).

B. *Condensation of the dimaleate ester of Carbowax 1500 with glyceryl monostearate*

Carbowax 1500 dimaleate, 249 g. (0.33 mole), glyceryl monostearate, 232 g. (0.66 mole), and 75 ml. xylene were placed in a one-liter, three-neck flask fitted with a water trap, condenser, stirrer, thermometer, and a nitrogen-inlet tube. The temperature was raised rapidly to 195–200° C. and maintained there for 3 hours. At the end of this period, 13.0 ml. of water of reaction had been collected. The xylene was removed by distillation under reduced pressure. The product, a tan, waxy solid, had an acid number of 5.9.

C. *Sulfonation of the condensation product of Carbowax 1500 dimaleate and glyceryl monostearate*

The product prepared in B, 481 g. (0.33 mole), $Na_2SO_3$, 7.9 g. (0.063 mole), denatured ethanol, 788 g., and water, 300 g., were placed in a three-liter, three-neck flask fitted with a condenser and stirrer. Heating was by means of a steam bath. After 15 minutes' refluxing, 55 g. (0.289 mole) of $Na_2S_2O_5$ was added. The mixture was maintained at reflux for 36 hours. At the end of this period the sulfonation was 87% complete. The excess bisulfite was oxidized to bisulfate with hydrogen peroxide, and the pH was raised to 6.0–6.5 by the addition of sodium hydroxide solution. The mixture was stripped to 83.3% solids. The product was a tan paste.

EXAMPLE 8

A. *Preparation of the dimaleate ester of Carbowax 4000*

Maleic anhydride, 24.5 g. (0.25 mole), and Carbowax 4000, 500 g. (0.125 mole), were placed in a one-liter, three-neck flask fitted with a condenser, stirrer, thermometer, and nitrogen gas-inlet tube. The temperature was raised to 145–150° C. and maintained there for four hours. The product, a tan, waxy solid, had an acid number of 27.4 (calc'd 26.8).

B. *Condensation of the dimaleate ester of Carbowax 4000 with glyceryl monostearate*

Carbowax 4000 dimaleate, 525 g. (0.125 mole), glyceryl monostearate, 87 g. (0.25 mole), and xylene, 75 ml., were placed in a one-liter, three-neck flask fitted with a condenser, water trap, stirrer, thermometer, and nitrogen-inlet tube. The temperature was rapidly raised to 195–200° C. and maintained there for 5½ hours. At the end of this period 4.5 ml. (100%) of water of reaction had been collected. The xylene was removed by distillation under reduced pressure. The product, a tan, waxy solid, had an acid number of 5.4.

C. *Sulfonation of the condensation product of Carbowax 4000 dimaleate and glyceryl monostearate*

The product prepared in B, 583 g., $Na_2SO_3$ (0.056 mole), denatured ethanol, 788 g., and water, 400 g., were placed in a three-liter, three-neck flask fitted with a condenser and stirrer. Heating was by means of a steam bath. After 15 minutes' refluxing, 19.6 g. (0.103 mole) $Na_2S_2O_5$ was added. The mixture was maintained at reflux for 30 hours. At the end of this period the sulfonation was 91% complete. The excess bisulfite was oxidized to bisulfate with hydrogen peroxide, and the pH was raised to 6.0–6.5 by the addition of sodium hydroxide solution. The mixture was stripped to 61.7% solids. The product was a tan, waxy paste.

EXAMPLE 9

A. *Preparation of the dimaleate ester of polypropylene glycol 400*

Maleic anhydride, 173 g. (1.74 moles), and polypropylene glycol 400, 349 g. (0.87 mole), were placed in a one-liter, three-neck flask fitted with a condenser, stirrer, thermometer, and nitrogen-inlet tube. The temperature was raised to 135–140° C. and maintained there for one hour. The product, a pale yellow liquid, had an acid number of 202 (calc'd 188).

B. *Condensation of the dimaleate ester of polypropylene glycol 400 with glyceryl monostearate*

Polypropylene glycol 400 dimaleate, 492 g. (0.866 mole, based on acid number), glyceryl monostearate, 616 g. (1.77 moles), and 75 ml. of xylene were placed in a one-liter, three-neck flask. The temperature was raised to 195–200° C. and maintained there for 4 hours. At the end of this period 33.0 ml. (103%) of water of reaction had been collected. The xylene was removed by distillation under reduced pressure. The product, a pale tan, waxy paste, had an acid number of 5.5.

C. *Sulfonation of the condensation product of polypropylene glycol 400 dimaleate and glyceryl monostearate*

The product prepared in B, 600 g. (0.478 mole), $Na_2SO_3$, 8 g. (0.064 mole), denatured ethanol, 788 g., and water, 200 g., were placed in a thee-liter, three-neck flask fitted with a condenser and stirrer. Heating was by means of a steam bath. After 15 minutes' refluxing, 92 g. (0.484 mole) $Na_2S_2O_5$ was added. The mixture was maintained at reflux for 22 hours. At the end of this period the sulfonation was 94.0% complete. The excess bisulfite was oxidized to bisulfate with hydrogen peroxide. The pH was raised to 6.0–6.5 by addition of sodium hydroxide solution. The mixture was stripped to 69.0% solids. The product was a white, waxy paste.

EXAMPLE 10

A. *Preparation of the dimaleate ester of polypropylene glycol 750*

Maleic anhydride, 85.3 g. (0.870 mole) and polypropylene glycol 750, 327 g. (0.436 mole), were placed in a one-liter, three-neck flask fitted with condenser, stirrer, thermometer, and nitrogen-inlet tube. The temperature was raised to 135–140° C. and maintained there for one hour. The product, a pale yellow, viscous liquid, had an acid number of 115.5 (calc'd 118.5).

B. *Condensation of the dimaleate ester of polypropylene glycol 750 and glyceryl monostearate*

Polypropylene glycol 750 dimaleate, 412 g. (0.425 mole, based on acid number), glyceryl monostearate, 295 g. (0.847 moles), and 75 ml. of xylene were placed in a one-liter, three-neck flask fitted with a water trap, condenser, stirrer, thermometer, and nitrogen-inlet tube. The temperature was raised to 195–200° C. and maintained there for 6 hours. At the end of this period 15.5 ml. (101%) of water of reaction had been collected. The xylene was removed by distillation under reduced pressure. The product, a pale tan, waxy solid, had an acid number of 4.0.

C. *Sulfonation of the condensation product of polypropylene glycol 750 dimaleate and glyceryl monostearate*

The product prepared in B, 711 g., $Na_2SO_3$, 6.7 g. (0.53 mole), denatured ethanol, 788 g., and water 200 g., were placed in a three-liter, three-neck flask fitted with a condenser and stirrer. Heating was by means of a steam bath. After 15 minutes' refluxing, Na₂S₂O₅, 80.8 g. (0.425 mole), was added. The mixture was maintained at reflux for 26½ hours, after which the sulfonation was 90.0% complete. The excess bisulfite was oxidized to bisulfate with hydrogen peroxide. The pH was raised to 6.0–6.5 by addition of sodium hydroxide solution. The mixture was stripped to 77.5% solids. The product was a white, waxy paste.

EXAMPLE 11

A. *Preparation of the dimaleate ester of polypropylene glycol 1200*

Maleic anhydride, 65.5 g. (0.67 mole), and polypropylene glycol 1200, 400 g. (0.33 mole), were placed in a one-liter, three-neck flask fitted with a condenser, stirrer, thermometer, and nitrogen-inlet tube. The temperature was raised to 135–140° C. and maintained there for one hour. The product, a pale yellow, viscous liquid, had an acid number of 78.7 (calc'd 80.3).

B. *Condensation of the dimaleate ester of polypropylene glycol 1200 and glyceryl monostearate*

Polypropylene glycol 1200 dimaleate, 465.5 g. (0.327 mole, based on acid number), glyceryl monostearate, 228 g. (0.655 mole), and 75 ml. xylene were placed in a two-liter, three-neck flask fitted with a water trap, condenser, stirrer, thermometer, and nitrogen-inlet tube. The temperature was raised to 195–200° C. and maintained there for 5½ hours. At the end of this period 10.5 ml. (89%) of the water of reaction had been collected. The xylene was removed by distillation under reduced pressure. The product, a pale tan, waxy solid, had an acid number of 7.7.

C. *Sulfonation of the condensation product of polypropylene glycol 1200 dimaleate and glyceryl monostearate*

The product prepared in B, 702 g., Na₂SO₃, 13.1 g. (0.104 mole), denatured ethanol, 788 g., and water, 200 g., were placed in a three-liter, three-neck flask fitted with a condenser and stirrer. Heating was by means of steam bath. After 15 minutes' refluxing, Na₂S₂O₅, 57.0 g. (0.300 mole), was added. The mixture was maintained at reflux for 22 hours. At the end of this period the sulfonation was 100% complete. The excess bisulfite was oxidized to bisulfate with hydrogen peroxide. The pH was raised to 6.0–6.5 by the addition of sodium hydroxide solution. The mixture was stripped to 90% solids. The product was a tan, waxy solid.

EXAMPLE 12

B. *Condensation of the dimaleate ester of polyethylene glycol 400 and cottonseed oil monoglyceride*

Polyethylene glycol 400 dimaleate (Example 5, Section A), 285 g. (0.50 mole), cottonseed oil monoglyceride, 362 g. (1.00 mole), and 80 ml. xylene were placed in a one-liter, three-neck flask fitted with water trap, condenser, stirrer, thermometer, and nitrogen-inlet tube. The temperature was raised to 185–190° C. and maintained there for 5½ hours. At the end of this period 18 ml. (100%) of water of reaction had been collected. The xylene was removed by distillation under reduced pressure. The product, a pale yellow, viscous liquid, had an acid number of 6.7.

C. *Sulfonation of the condensation product of polyethylene glycol 400 dimaleate and cottonseed oil monoglyceride*

The product prepared in B, 311 g., Na₂SO₃, 5.0 g. (0.0397 mole), denatured ethanol, 630 g., and water, 300 g., were placed in a three-liter, three-neck flask fitted with a condenser and stirrer. Heating was by means of a steam bath. After refluxing for 15 minutes, Na₂S₂O₅, 45.5 g. (0.239 mole), was added. The mixture was maintained at reflux for 30 hours. At the end of this period the sulfonation was 100% complete. The excess bisulfite was oxidized to bisulfate with hydrogen peroxide. The pH was raised to 6.0–6.5 by the addition of sodium hydroxide solution. The mixture was stripped to 68% solids. The product was a pale yellow, viscous liquid.

EXAMPLE 13

A. *Condensation of the dimaleate ester of polyethylene glycol 400 with tallow diglyceride*

Polyethylene glycol 400 dimaleate prepared as described under Example 5, 579 g. (1.04 moles, calculated from the acid number), tallow diglyceride, 1244 g. (2.08 moles) and 150 ml. of xylene were placed in a three-liter, three-neck flask fitted with a water trap, condenser, stirrer, thermometer and nitrogen-gas inlet tube. The temperature was raised to 200–205° C. and maintained there until water of reaction had ceased to distill. After 12 hours at 200–205° C., 33.2 ml. (90%) of water had been collected. The xylene was removed by distillation under reduced pressure. The resulting dark-brown, pasty product had an acid number of 9.6.

B. *Sulfonation of the condensation product of the dimaleate ester of polyethylene glycol 400 and tallow diglyceride*

The product prepared in A, 1718 g., Na₂SO₃, 37 g. (0.294 mole), 700 ml. of water and 1500 ml. of denatured ethanol were placed in a five-liter, three-neck flask fitted with a condenser and stirrer. After refluxing for 15 minutes on a steam bath, 181 g. of Na₂S₂O₅ (0.953 mole) was added and refluxing was continued for 56 hours. At the end of this period of time, sulfonation of the condensation product was 88.2% complete. The excess bisulfite was oxidized with hydrogen peroxide to the bisulfate, and the pH of the reaction mass was then adjusted to 6–6.5 with a solution of sodium hydroxide. The mixture was stripped to 67.7% solids. The resulting product was a brown, soft, wax-like solid.

EXAMPLE 14

A. *Preparation of the diitaconate ester of polyethylene glycol 400*

Itaconic anhydride, 112 g. (1.0 mole), was placed in a one-liter, three-neck flask fitted with a condenser, stirrer, thermometer, and nitrogen-inlet tube. Polyethylene glycol 400, 197.5 g. (0.5 mole, calculated from the hydroxyl number), was added and the resulting mixture was heated to 145° C. After holding the reaction mass at this temperature for 1½ hours, the resulting yellow, viscous product had an acid number of 187.6 (calculated, 181.3).

B. *Condensation of the diitaconate ester of polyethylene glycol 400 with glyceryl monostearate*

The product prepared in A, 299 g. (0.5 mole, calculated from the acid number), glyceryl monostearate, 350 g. (1.0 mole, calculated from the saponification number) and 50 ml. of xylene were placed in a one-liter, three-neck flask fitted with a water trap, condenser, stirrer, thermometer and nitrogen-gas inlet tube. The temperature was quickly raised to 200° C. After heating for a total of 8 hours at 200–205° C., 18.5 ml. (103%) of water had been collected. Removal of the xylene under reduced pressure yielded a light-brown, waxy, solid condensation product having an acid number of 3.7.

C. *Sulfonation of the condensation product of glyceryl monostearate and the diitaconate ester of polyethylene glycol 400*

The product prepared in B, 600 g., Na₂SO₃, 5.1 g. (0.040 mole), denatured ethanol, 400 ml., and water, 150 ml., were placed in a two-liter, three-neck flask fitted with a stirrer and condenser. After heating under reflux on a steam bath for 15 minutes, 101 g. (0.532 mole) of Na₂S₂O₅ was added. The resulting mixture was refluxed for 48 hours, at the end of which time sulfonation was 86.5% complete. The excess bisulfite was oxidized to bisulfate with hydrogen peroxide, and the pH was raised to 6–6.5 by the addition of a solution of sodium hydroxide. The resulting reaction mass was stripped to 71.2% solids. The sulfonated product was a tan-colored, waxy paste.

EXAMPLE 15

A. *Preparation of the difumarate ester of polyethylene glycol 400 and conversion to the glyceryl monostearate bis ester thereof*

Fumaric acid, 116 g. (1.0 mole), was slurried in 50 ml. of xylene, containing 2 g. of β-naphthalene sulfonic acid (esterification catalyst), in a one-liter, three-neck flask equipped with a condenser and water trap, stirrer, thermometer, nitrogen-inlet tube and dropping funnel. After heating to reflux, polyethylene glycol 400, 197.5 g. (0.5 mole), was added dropwise over a 3-hour period while the temperature was gradually raised to 200–210° C. over a 1-hour period. The removal of xylene during this first hour of heating facilitated the rise in temperature. After reaching 200–210° C., the reaction mass was held at this temperature during the remaining 2 hours of the period during which the polyethylene glycol 400 was added thereto. Heating of the reaction mass was then continued for an additional hour at 200–205° C. Since 17.9 ml. of water had collected in the trap, the reaction was considered to be complete.

To the hot, brown, liquid difumarate ester of polyethylene glycol 400 was added 349 g. (1 mole) of glyceryl monostearate, and the resulting solution was heated at 200–205° C. for 7 hours. Since 19.0 ml. of water had collected in the trap, the reaction was considered to be complete. The brown, condensation product was stripped of xylene. It had an acid number of 9.6 (including the catalyst).

B. *Sulfonation of the condensation product of A*

The product prepared in A was transferred while hot to a three-liter, three-neck flask fitted with a stirrer and condenser Sodium sulfite ($Na_2SO_3$), 14 g. (0.11 mole), 300 ml. of water and 800 ml. of denatured ethyl alcohol were added and the resulting mixture was heated to reflux. After refluxing for 15 minutes, 94 g. (0.495 mole) of $Na_2S_2O_5$ was added, and the solution was maintained at reflux temperature for an additional 36 hours. At the end of this time the sulfonation was 93% complete. The excess bisulfite was oxidized to bisulfate with hydrogen peroxide and the pH was raised to 6–6.5 with sodium hydroxide solution. The resulting reaction mass was stripped to 68.1% solids, yielding a light-brown, waxy paste.

Polyethylene glycol 400, which was used in a number of the foregoing examples, is predominantly nonaethylene glycol. Instead of this particular polyethylene glycol, one can use as the glycol reactant in the foregoing examples, polyethylene glycol 200 which is predominantly tetraethylene glycol or polyethylene glycol 300 which is predominantly hexaethylene glycol.

We claim:

1. A salt which is an addition product of (1) a bisulfite and (2) a polyester which is a condensation product of (A) a glycerol ester selected from the class consisting of fatty acid monoglycerides, fatty acid diglycerides and mixtures thereof, wherein the fatty acid component thereof contains at least 8 carbon atoms, with (B) an esterification product of (a) an aliphatic dihydroxy compound selected from the class consisting of alkylene glycols and polyoxyalkylene glycols and (b) an ethylenically unsaturated dicarboxylic compound selected from the class consisting of ethylenically unsaturated dicarboxylic acids and anhydrides thereof, the ethylenically unsaturated grouping of the said dicarboxylic compound being alpha to a carbonyl group, and the reactants of (A) and (B) being employed in a molar ratio of about 2 moles of the former to 1 mole of the latter and the reactants of (a) and (b) being employed in a molar ratio of 1 mole of the former to about 2 moles of the latter.

2. A salt which is an addition product of a bisulfite of an organic base and a polyester of the kind defined under (2) of claim 1.

3. A salt which is an addition product of a bisulfite of an inorganic base and a polyester of the kind defined under (2) of claim 1.

4. A salt which is an addition product of sodium bisulfite and a polyester of the kind defined under (2) of claim 1.

5. A salt as in claim 1 wherein the glycerol ester of (A) that is used in making the polyester of (2) is a fatty acid monoglyceride.

6. A salt as in claim 1 wherein the aliphatic dihydroxy compound of (a) that is used in making the esterification product of (B) is an alkylene glycol.

7. A salt as in claim 1 wherein the aliphatic dihydroxy compound of (a) that is used in making the esterification product of (B) is a polyoxyalkylene glycol.

8. A salt as in claim 1 wherein the ethylenically unsaturated dicarboxylic compound of (b) that is used in making the esterification product of (B) is maleic anhydride.

9. A salt which is an addition product of (1) a bisulfite and (2) a polyester which is a condensation product of (A) a glyceryl ester comprising glyceryl monostearate and (B) a polyethylene glycol dimaleate comprising mainly hexaethylene glycol dimaleate, the reactants of (A) and (B) being employed in a molar ratio of about 2 moles of the former to 1 mole of the latter.

10. A salt which is an addition product of (1) a bisulfite and (2) a polyester which is a condensation product of (A) a glyceryl ester comprising glyceryl monostearate and (B) a polyethylene glycol dimaleate comprising mainly nonaethylene glycol dimaleate, the reactants of (A) and (B) being employed in a molar ratio of about 2 moles of the former to 1 mole of the latter.

11. A salt which is an addition product of (1) a bisulfite and (2) a polyester which is a condensation product of (A) a glyceryl ester comprising glyceryl monostearate and (B) a dimaleate ester of a polyethylene glycol having an average molecular weight of from 570 to 630, the reactants of (A) and (B) being employed in a molar ratio of about 2 moles of the former to 1 mole of the latter.

12. The method of making a new addition product which comprises esterifying an aliphatic dihydroxy compound selected from the class consisting of alkylene glycols and polyoxyalkylene glycols with an ethylenically unsaturated dicarboxylic compound selected from the class consisting of ethylenically unsaturated dicarboxylic acids and anhydrides thereof, the ethylenically unsaturated grouping of the said dicarboxylic compound being alpha to a carbonyl group, and the said aliphatic dihydroxy compound and dicarboxylic compound being employed in a molar ratio of 1 mole of the former to about 2 moles of the latter; condensing the resulting esterification product with a glycerol ester selected from the class consisting of fatty acid monoglycerides, fatty acid diglycerides and mixtures thereof, wherein the fatty acid component thereof contains at least 8 carbon atoms, the said esterification product and glycerol ester being employed in a molar ratio of 1 mole of the former to about 2 moles of the latter; and reacting the polyester thereby obtained with a bisulfite to form a salt which is an addition product of the bisulfite and the said polyester.

References Cited in the file of this patent

UNITED STATES PATENTS 2,328,062    De Groote et al. _____ Aug. 31, 1943